US006407908B1

(12) United States Patent
Iryo et al.

(10) Patent No.: US 6,407,908 B1
(45) Date of Patent: Jun. 18, 2002

(54) GAS-INSULATED CIRCUIT BREAKER AND GAS-INSULATED SWITCH-GEAR HAVING THE SAME

(75) Inventors: Takeshi Iryo, Kashiwa; Hideo Kawamoto, Hitachi, both of (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 09/679,044

(22) Filed: Oct. 4, 2000

(30) Foreign Application Priority Data

Oct. 14, 1999 (JP) .......................................... 11-292593

(51) Int. Cl.[7] ............................................... H02B 13/02

(52) U.S. Cl. ....................... 361/604; 361/612; 361/605; 361/622; 361/631; 200/82 B; 218/69; 218/134; 218/139; 337/28

(58) Field of Search ................................ 361/604, 612, 361/602, 605, 611–625, 600, 631–634, 117–120, 38–40; 337/28; 218/43–50, 55, 67–68, 79–89, 69, 134, 139, 75; 200/446, 82 B

(56) References Cited

U.S. PATENT DOCUMENTS 3,794,799 A * 2/1974 Spindle et al. .......... 200/153 G
4,101,748 A * 7/1978 Meyer et al. ........... 200/148 A
4,570,202 A * 2/1986 Nishida et al. ............. 361/333
4,700,270 A * 10/1987 Manzinger et al. ......... 361/341
5,864,108 A * 1/1999 Rohling et al. ............. 218/134

FOREIGN PATENT DOCUMENTS

JP 409082183 A * 3/1997 .......... H01H/33/56
JP 02000182483 A * 6/2000 .......... H01H/33/42

* cited by examiner

*Primary Examiner*—Darren Schuberg
*Assistant Examiner*—Michael Datskovsky
(74) *Attorney, Agent, or Firm*—Mattingly, Stanger & Malur, P.C.

(57) ABSTRACT

In order to provide a good gas-insulated circuit breaker which is compact and easy in assembling and preparation, a gas-insulated circuit breaker 100 is constructed with a grounded enclosure 104 enclosed a insulation nature gas, a current interruption part having a fixed contactor 115 arranged in the grounded enclosure 104 and a movable contactor 116 to be contacted with and to be separated from the fixed contactor 115, and an operating mechanism 101 to output a driving force to drive the movable contactor 116, wherein a grounded enclosure side main rotating shaft 110 connected to the movable contactor 116 through a connection member and a main output shaft 102 for outputting a rotating force to actuate the movable contactor 116 through the grounded enclosure side main rotating shaft 110 provided on the operating mechanism 101, are arranged on a coax so as to be coupled with a gear coupling 120, and the operating mechanism 101 is arranged almost under the grounded enclosure 104.

5 Claims, 7 Drawing Sheets

GAS-INSULATED CIRCUIT BREAKER AND GAS-INSULATED SWITCH-GEAR HAVING THE SAME

BACKGROUND OF THE INVENTION

Present invention relates to a gas-insulated circuit breaker having a gas-insulated circuit breaker constructed with a fixed contactor and a movable contactor for being contacted with and being separated from the fixed contactor which are installed in a grounded enclosure enclosing insulation gas, and a gas-insulated interruption part installing the gas-insulated circuit breaker.

In a conventional gas-insulated circuit breaker, a lot of parts are needed in order to connect a moving part for moving a movable contactor with an operating mechanism for communicating a driving force to the movable contactor.

At the same time, after having converted a motion in a rotation system of operating mechanism output shaft into a motion of a linear system once through a lever and a rod, it is converted into rotational motion again, after that, a complicated constitution is performed as that the motion of the movable contactor is converted into a linear motion through the link or the lever again.

In addition, as show in FIG. 7 relating to a conventional insulation switchgear disclosed in Japanese Patent Laid-open No. 5-266765 bulletin, a space to be arranged parts which is necessary for connecting a moving part provided in a mechanism box 2 with an operating mechanism 3, should be arranged in neighborhood of a switchgear body 1, and the operating mechanism 3 becomes impossible to be arranged just under the switchgear body 1 so as to be arranged on the side of the switchgear body 1.

As mentioned above, when a connection structure and an operating mechanism arrangement as disclosed in Japanese Patent Laid-open No. 5-266765 bullet are adopted?

As the operating mechanism can not be arranged just under the switchgear body, in other words, the grounded enclosure, an outside dimension of the whole apparatus becomes big, there is a problem not to be able to support a social needs such as an effective activity and improvement of economical efficiency of the power station/substation space fully.

In addition, as the parts which is necessary for connecting the operating mechanism to communicate a driving force to a movable contactor with the moving part works at high speed in current a opening and closing motion, there is a problem judging from working insurance side in maintenance inspection, and as there are many movable parts and it is complicated to assemble it, and there is a problem on assembling and quality sides. Furthermore, in the opening and closing motion, mass of the parts to be driven increases, and there arises a problem that it became difficult that a driving force of the operating mechanism for driving the movable contactor effectively is reduced.

SUMMARY OF THE INVENTION

An object of a present invention is to provide a gas-insulated circuit breaker and a gas-insulated switching gear which is small and has good assembling and preparation nature.

In order to achieve an object stated above, the characteristic feature of a gas-insulated circuit breaker in the present invention is to arrange a grounded enclosure side main rotating shaft connected to the movable contactor provided in the grounded enclosure through a connection member and a main output shaft for outputting a rotating force to actuate the movable contactor through the grounded enclosure side main rotating shaft provided on the operating mechanism, on a coax.

A present invention provides a circuit breaker and a switch gear in the next place to be concrete as follows. In a gas-insulated circuit breaker having a grounded enclosure enclosing insulation gas, an electric current interrupter having a fixed contactor provided in the grounded enclosure and a movable contactor for being contacted with and being separated from the fixed contactor, and an operating mechanism for outputting actuating force to actuate the movable contactors, the present invention is characterized in that a grounded enclosure side main rotating shaft connected to the movable contactor through a connection member, and a main output shaft for outputting a rotating force to actuate the movable contactor through the grounded enclosure side main rotating shaft provided on the operating mechanism, are arranged on a coax.

In addition, in a gas-insulated circuit breaker having a grounded enclosure enclosing insulation gas, an electric current interrupter having a fixed contactor provided in the grounded enclosure and a movable contactor for being contacted with and being separated from the fixed contactor, and an operating mechanism for outputting actuating force to actuate the movable contactors, the present invention is characterized in that a grounded enclosure side main rotating shaft connected to the movable contactor through a connection member and a main output shaft for outputting a rotating force to actuate the movable contactor through the grounded enclosure side main rotating shaft provided on the operating mechanism, are arranged on a coax, and the grounded enclosure side main rotating shaft is connected to the main output shaft through a gear coupling.

In addition, in a gas-insulated circuit breaker having a grounded enclosure enclosing insulation gas, an electric current interrupter having a fixed contactor provided in the grounded enclosure and a movable contactor for being contacted with and being separated from the fixed contactor, and an operating mechanism for outputting actuating force to actuate the movable contactors, the present invention is characterized in that a grounded enclosure side main rotating shaft connected to the movable contactor through a connection member and a main output shaft for outputting a rotating force to actuate the movable contactor through the grounded enclosure side main rotating shaft provided on the operating mechanism, are arranged on a coax so as to be coupled with a gear coupling, and said operating mechanism is arranged almost under the grounded enclosure.

Preferably, a movable pulley letting the operating mechanism move to top and bottom and to right and left is provided.

In a gas-insulated switching gear having a grounded enclosure for bus having a metal conductor to transport electric power and contactors to open and close mechanically, a gas-insulated circuit breaker and a line side grounded enclosure, the present invention is characterized by having a grounded enclosure enclosing an insulation gas, a current interruption part having a fixed contactor and a movable contactor to be contacted with and be separated from the fixed contactor provided in the grounded enclosure, and an operating mechanism which outputs driving force to drive the movable contactor, wherein a grounded enclosure side main rotating shaft connected to the movable contactor through a connection member and a main output shaft for outputting a rotating force to actuate the movable contactor through the grounded enclosure side main rotating shaft provided on the operating mechanism, are arranged on a coax so as to be coupled with a gear coupling, rotation torque to be outputted by the main output shaft is transmitted to the grounded enclosure side main rotating shaft by using a gear coupling, and the operating mechanism is arranged almost under the grounded enclosure.

DETAILED DESCRIPTION OF THE PREFERRED EMBODIMENT

A gas-insulated circuit breaker and a gas-insulated switching gear having the gas-insulated circuit breaker as an embodiment of the present invention will be explained using drawings as follows.

Figure 1:
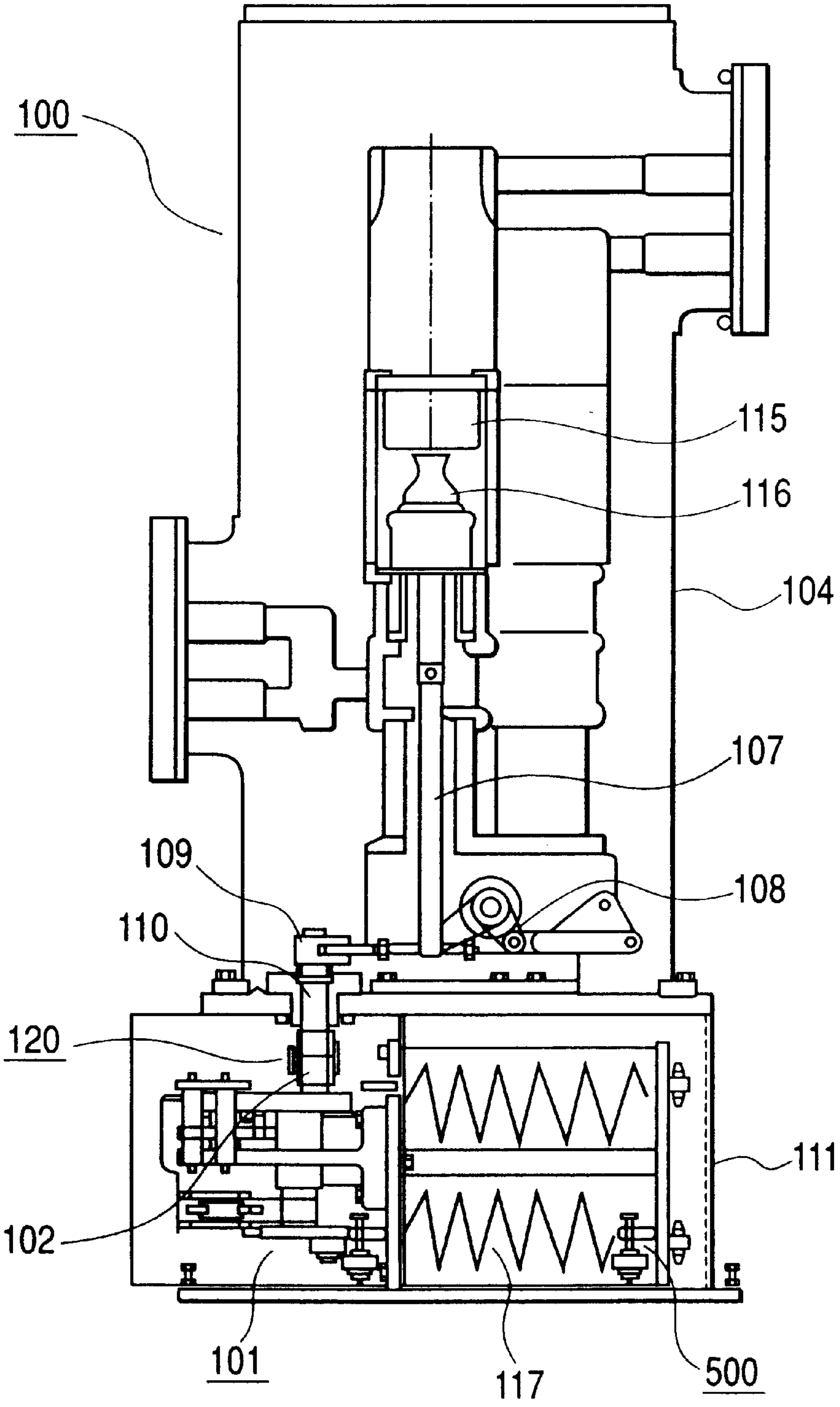
FIG. 1 is a side-view for showing a constitution of the gas-insulated circuit breaker as an embodiment of the present invention.

FIG. 1 is a side-view showing a constitution of the gas-insulated circuit breaker relating to an embodiment of the present invention.

As shown in FIG. 1, a gas-insulated circuit breaker 100 is constituted with an operating mechanism 101 having a main output shaft 102 to output a spring force 117 as a driving force which is compressed and stored by a motor or manual-operation beforehand, a grounded enclosure 104 that enclosed an insulation gas, and a current interruption part having a fixed contactor 115 arranged in the grounded enclosure 104 and a movable contactor 116 to be contacted with and be separated from the fixed contactor 115. A movable contactor 116 is connected to a grounded enclosure side main rotating shaft 110 through a link 107 as a connection member and levers 108 and 109.

The operating mechanism 101 is arranged in an operating mechanism box 111 arranged almost under a grounded enclosure 104, and the main output shaft 102 of the operating mechanism 101 and the main rotating shaft 110 in a side of the grounded enclosure 104 are arranged on a coax, and are connected with a gear coupling 120.

In operating mechanism 101, it is arranged a movable pulley 500 to let the operating mechanism 101 move to an arbitrary direction of top and bottom and front and back all around. The movable pulley 500 has a wheel **500*a* and a pulley going up and down bolt 500*b***.

As stated above, by arranging the operating mechanism 101 almost under the grounded enclosure 104, the operating mechanism 101 does not protrude from the grounded enclosure 104, miniaturization of the gas-insulated circuit breaker 100 may be attained, and reduction of a setting area may be planned.

In the opening and closing motion of the electric current, as the moving part working at a high speed is arranged in the operating mechanism box 111, improvement of security may be planned.

Figure 2:
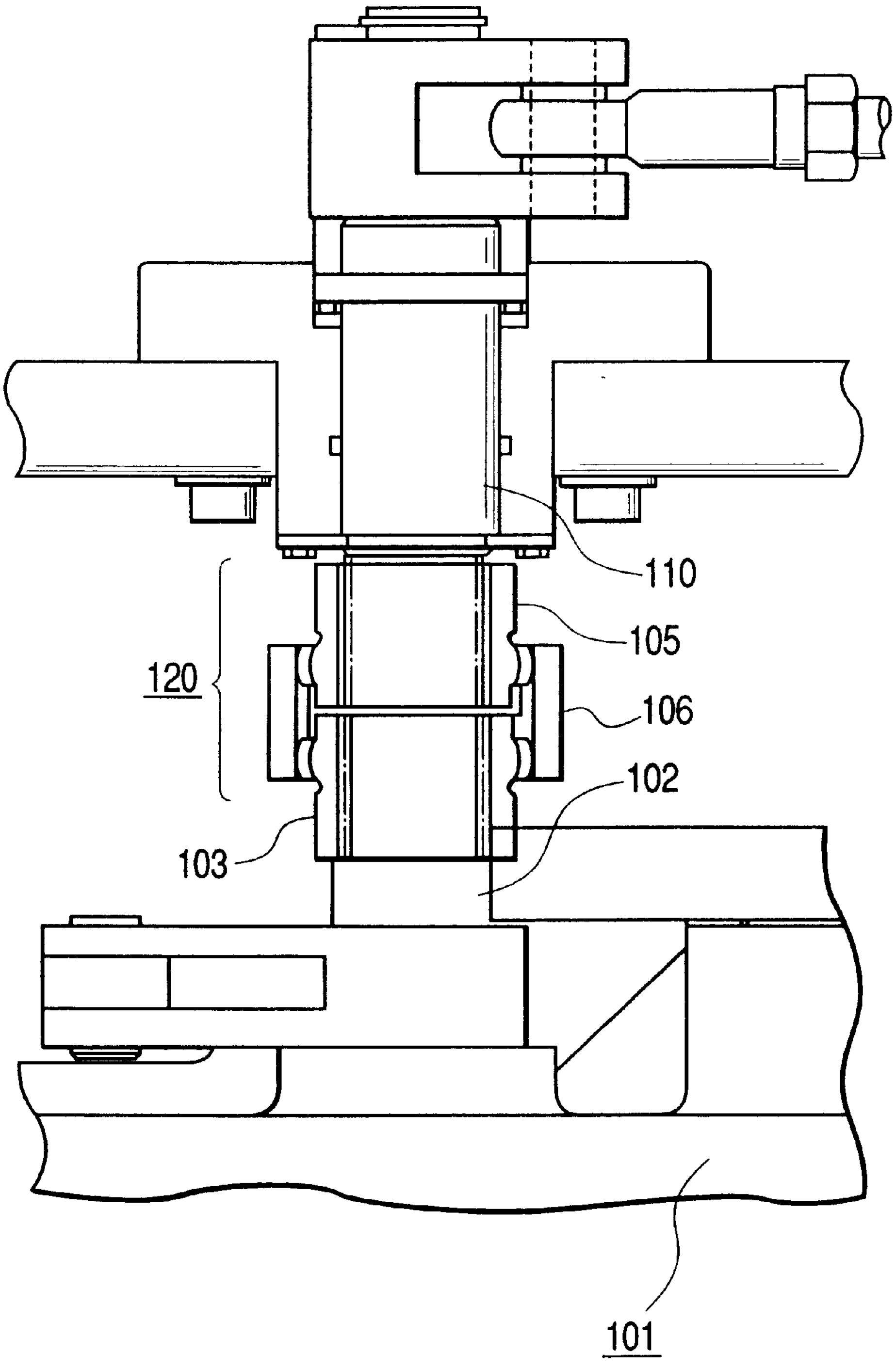
FIG. 2 is a detailed construction view of the gear coupling of the gas-insulated circuit breaker shown in FIG. 1.

FIG. 2 shows a detailed construction of the gear coupling 120 of the gas-insulated circuit breaker in FIG. 1. The gear coupling 120 is constituted with a main output shaft side spline gear 103 mounted on a main output shaft 102 in a side of the operating mechanism 101, a main rotating shaft side spline gear 105 mounted on the grounded enclosure side main rotating shaft 110, and an outer cylindrical spline gear 106 to connect the main output shaft side spline gear 103 to the main rotating shaft side spline gear 205.

Figure 3:
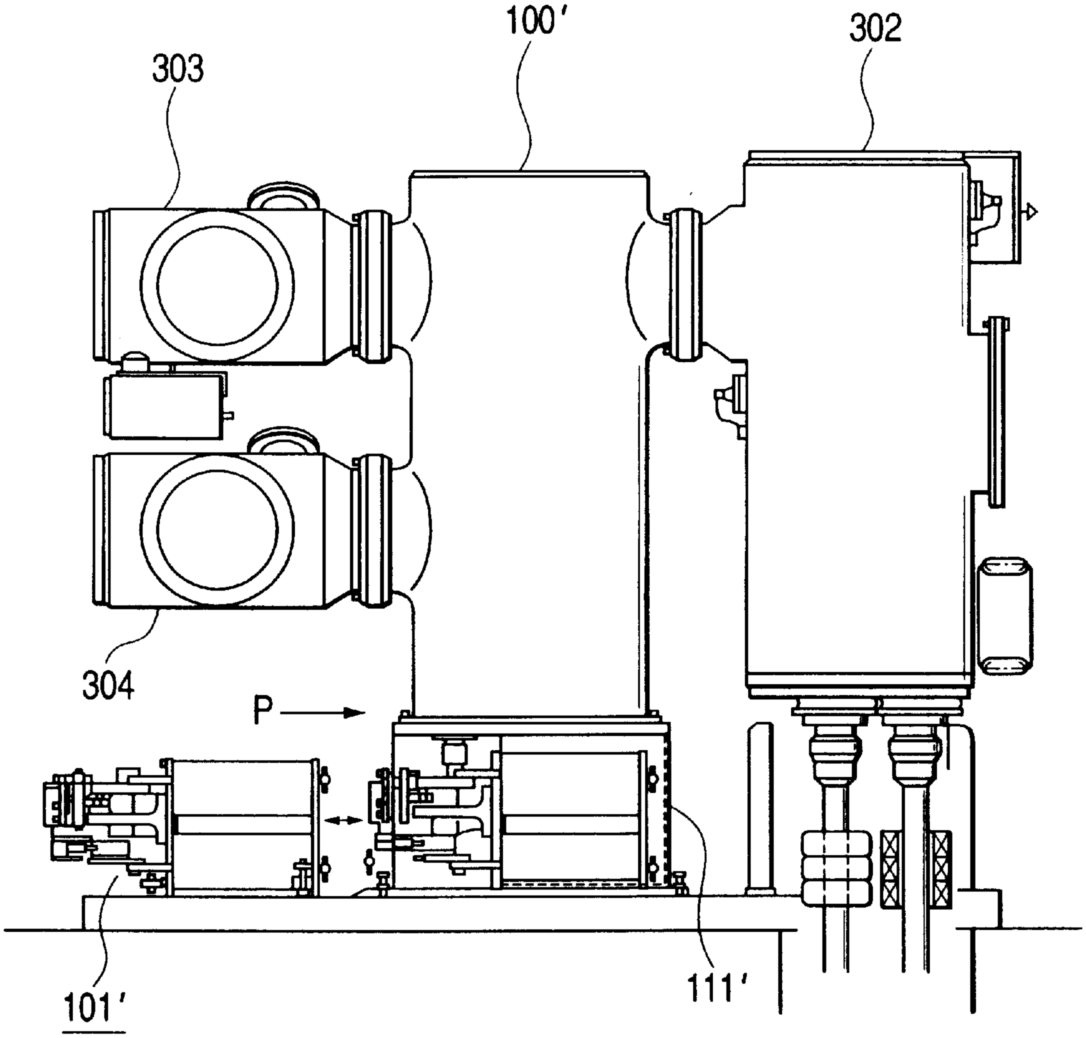
FIG. 3 is a side-view of the gas-insulated switching gear having the gas-insulated circuit breaker as an embodiment of the present invention.
Figure 4:
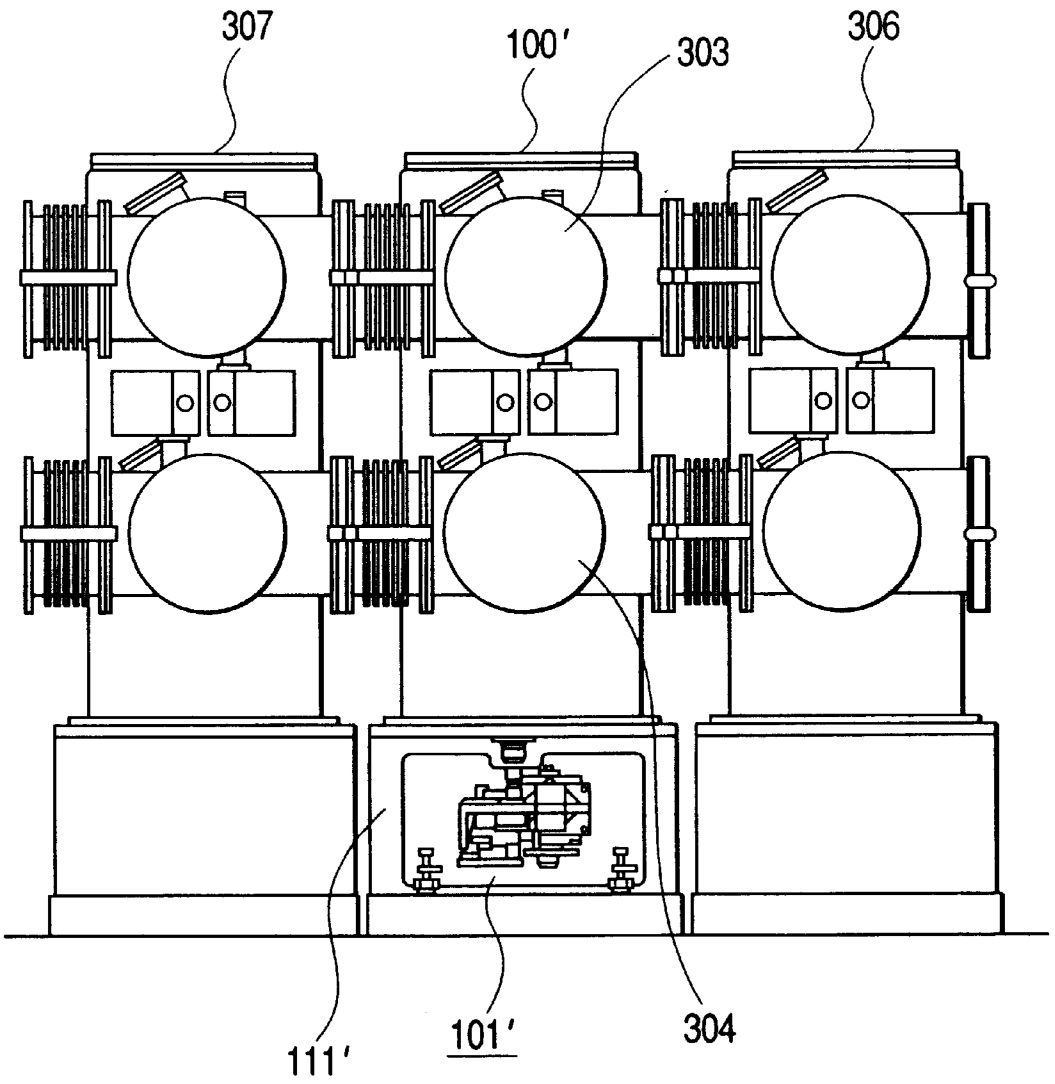
FIG. 4 is a front view of the gas-insulated switching gear shown in FIG. 3.

FIG. 3 is a side-view of the gas-insulated switching gear having a gas-insulated circuit breaker relating to an embodiment example of a present invention, and FIG. 4 is a front view of the gas-insulated switching gear shown in FIG. 3.

It will be explained a case to detach the operating mechanism from the operating mechanism box when maintenance inspection of the equipment is performed or any trouble outbreaks by using FIG. 3 and FIG. 4. As reduction of equipment installation area is demanded as social needs strongly, it increases that each equipment becomes to be installed close very much as shown in FIGS. 3, 4.

This gas-insulated switching gear is constituted with a gas-insulated circuit breaker 100' as an embodiment of the present invention stated above, a line side grounded enclosure 302 to feed an electric power from outside of the power station/substation, and grounded enclosures 303, 304 for the bus electrically connected to other line equipments 306, 307. In each of the grounded enclosures, metal conductors to transport electric power and contactors to mechanically contact and separate.

Because each line and the other line equipments 306, 307 are arranged very close as shown in FIG. 4, an access only from one side of the equipment is possible (a side shown with an arrow P in a case of this drawing), when maintenance inspection working of the operating mechanism 101' is performed, it becomes difficult to perform enough maintenance working for interior of miniaturized operating mechanism box 111', and a problem not to be able to maintain engine-performance arises.

Referring to the above mentioned background, it has a big advantage from a point of view of working reliability, security and workability of the inspection working, to perform the maintenance working in a state to completely drew the operating mechanism 101' from the operating mechanism box 111' independently.

Figure 5:
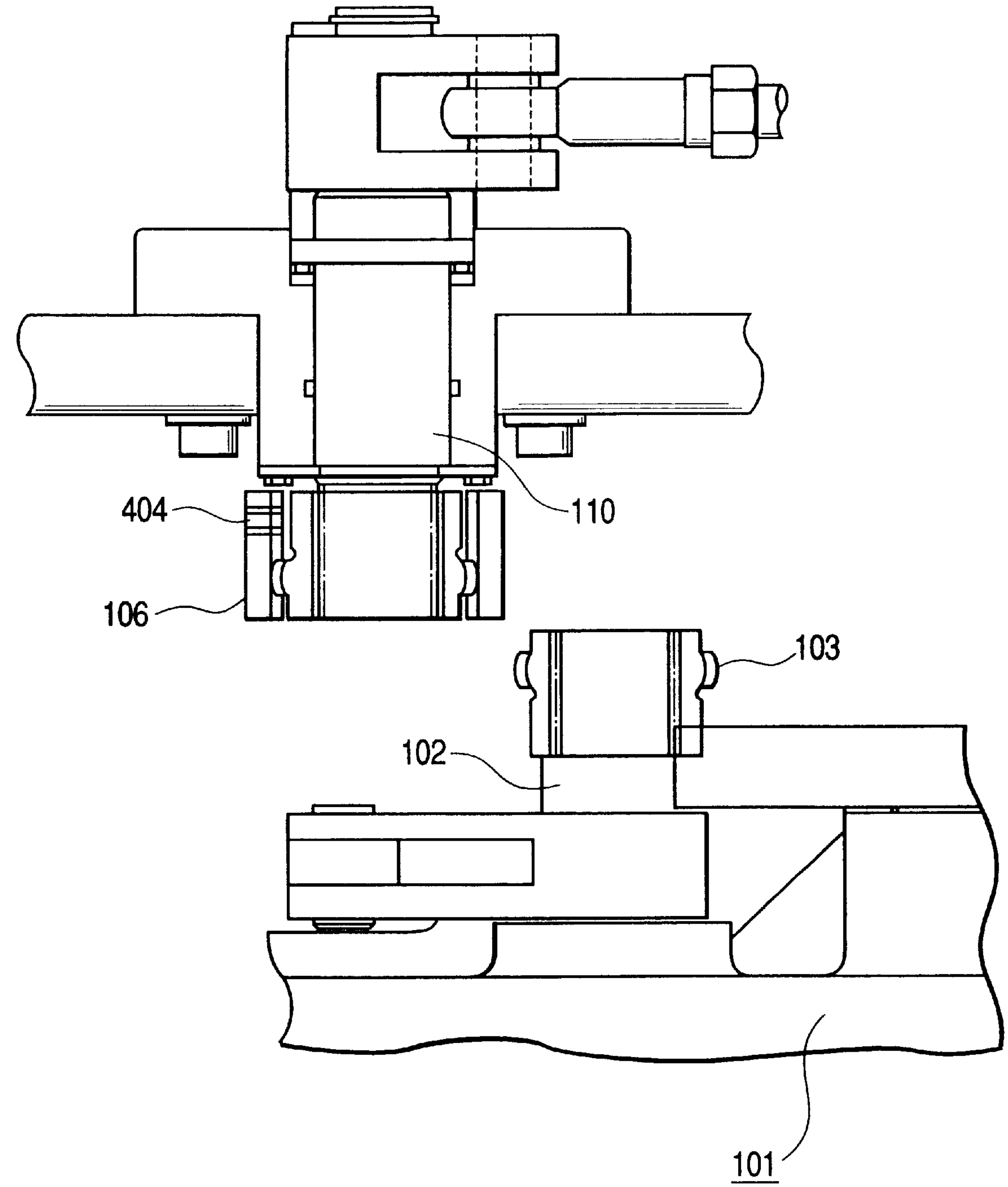
FIG. 5 is a figure to show a connecting part for connecting the main output shaft of the operating mechanism side with the grounded enclosure side main rotating shaft.

A working order in putting on and taking off of the operating mechanism will be explained in the next. When the operating mechanism 101 is carried in the operating mechanism box 111, and the main output shaft 102 of operating mechanism 101 side and the grounded enclosure side main rotating shaft 110 are connected, At first as shown in FIG. 5, outer cylindrical spline gear 106 is fixed beforehand using a screw 404 to the main rotating shaft side spline gear 105 mounted on the grounded enclosure side main rotating shaft 110, and the main output shaft side spline gear 103 is mounted on the main output shaft 102 of the operating mechanism 101 side.

Figure 6:
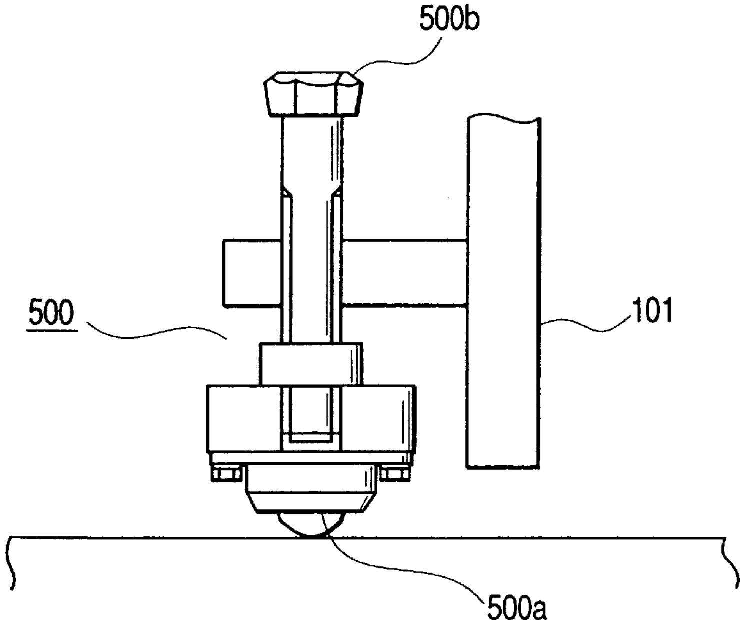
FIG. 6 is a detailed construction view of the movable pulley provided on the operating mechanism.
Figure 8:
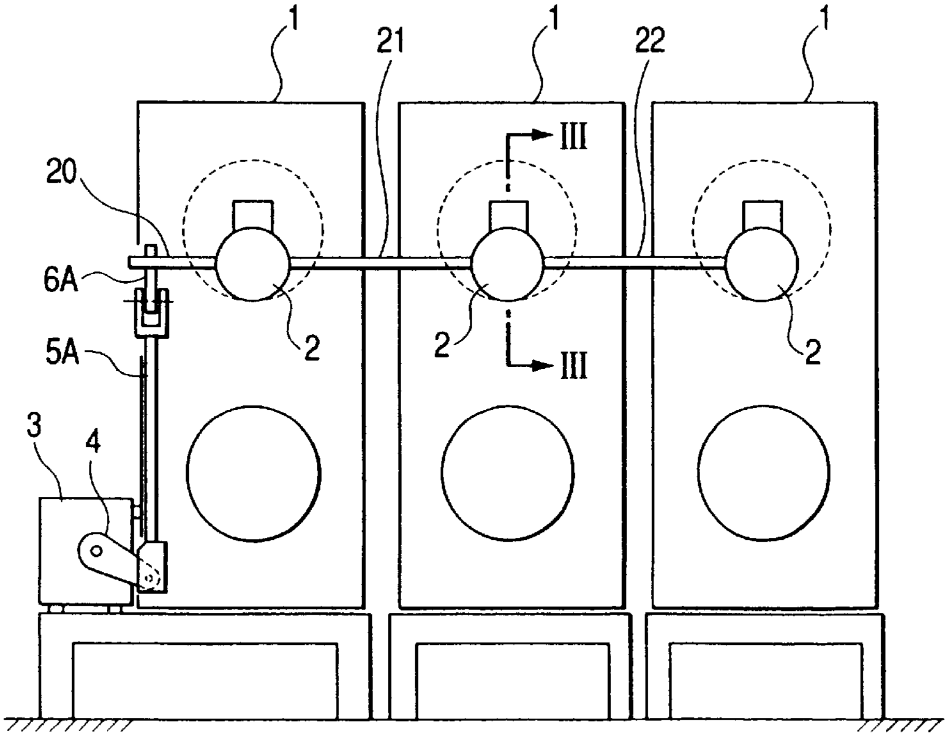
FIG. 8 PRIOR ART
FIG. 8 is a view for showing an operating mechanism mounting construction in a conventional gas-insulated switching gear.

As shown in FIG. 6 in the next, the pulley going up and down bolt 500*b* is screwed in, the operating mechanism 101 is floated, and the operating mechanism 101 is stored away in the operating mechanism box 111 by a manual control. The movable pulleys 500 are provided on around 4 places of the operating mechanism 101, wheels 500*a* of ball shape which are movable to right and left and front and back arbitrarily, and a fine tuning of a core difference may be done.

In the next, after having identified that an axis core of the grounded enclosure side main rotating shaft 110 agrees with a center of the main output shaft 102 of the operating mechanism 101, and the outer cylindrical spline gear 106 is engaged easily, the operating mechanism 101 is bolted on the operating mechanism box installation board. Then, the gear coupling 120 processed with R shape on the gear called crowning so as to permit a core difference between some axis.

In stead of applying this gear coupling 120, even if general spline is used, a gas-insulated circuit breaker same as the present invention may be realized. However, in this case, it is difficult to absorb the core difference between the operating mechanism output shaft and the grounded enclosure side main rotating shaft occurring in putting on and off of the operating mechanism necessarily.

Figure 7:
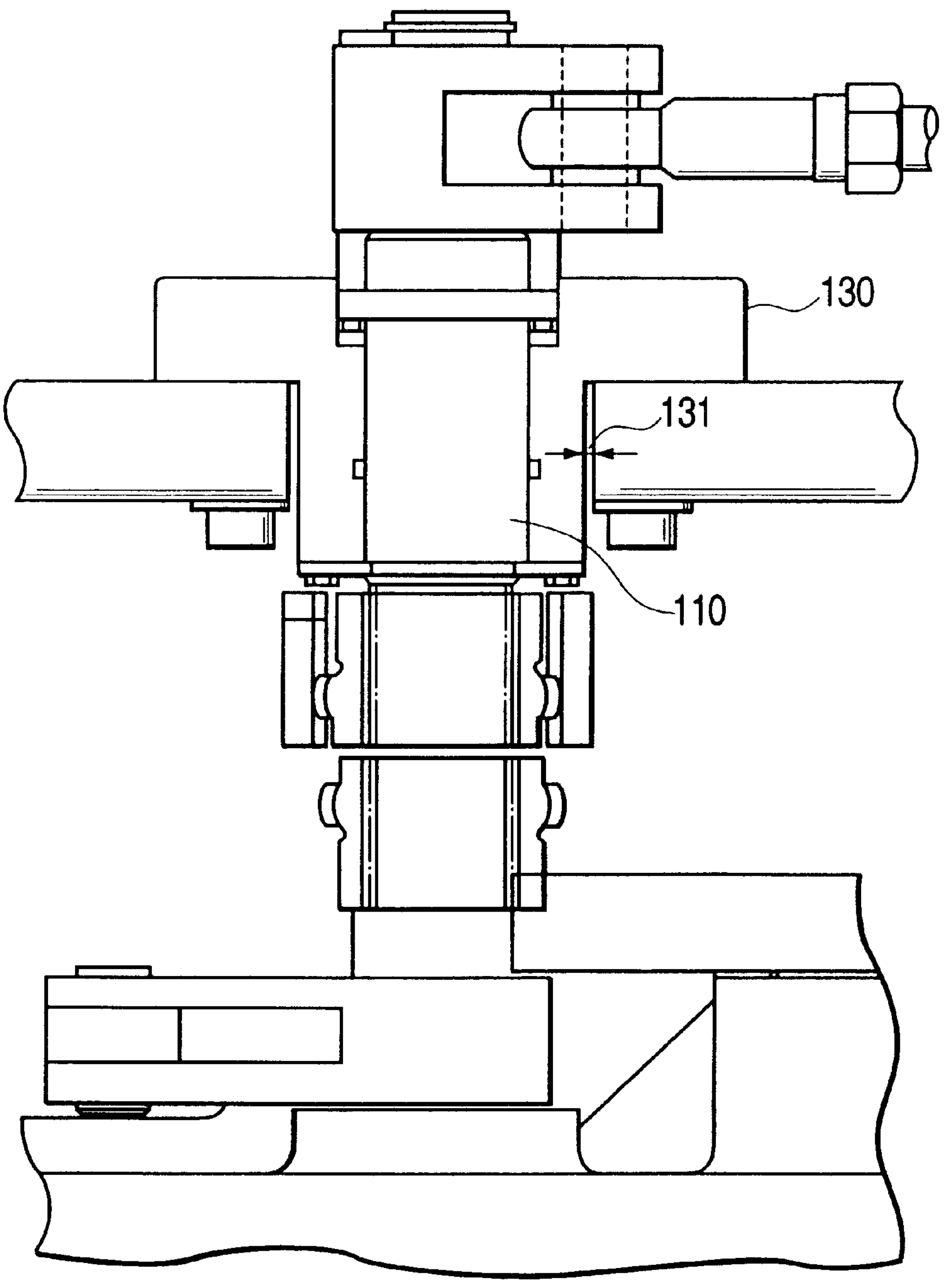
FIG. 7 is a block-diagram of the grounded enclosure side main rotating shaft part.

Therefore, even if being able to mount in a factory assembly operation with a comparatively high freedom degree of the working, when an operating mechanism is detached in the inspection after the equipment delivery once, it becomes difficult that it is installed again. This is because the hole of general spline fits to the axis severely and a construction which does not permit any lean of the axis hole is provided. In addition, in the present invention, in a dimension to be able to absorb the core difference only with the gear coupling 120, an idea is proposed as shown in FIG. 7 in order to completely remove a possibility to make the mounting of the operating mechanism 101 impossible after detaching the operating mechanism 101. The boss 130 to support the grounded enclosure side main rotating shaft 110 is provided to be able to move only gap 131, the gap 131 is coordinated, and a core difference may be absorbed when the core difference can not be absorbed only the gear coupling 120 by any chance.

By a construction mentioned above, an assembling nature is improved, disconnection and reassemble of the operating mechanism 101 to be executed in the operating mechanism inspection, become possible to be done easily in a short time.

In addition, the security in the inspection becomes possible to be improved with a reduction of the equipment installation area by miniaturization of the equipment and with completely storing the moving part working in the opening and closing motion at a high speed in the operating mechanism box.

According to the present invention, as the operating mechanism becomes to be arranged almost under the grounded enclosure, the miniaturization of the gas-insulated circuit breaker may be planned, and the reduction of the setting area of the gas-insulated switching gear may be planned.

In addition, the number of the parts being movable in the opening and closing motion may be reduced and the assembling production is improved by arranging the grounded enclosure side main rotating shaft and the main output shaft of the operating mechanism on the coax.

As the gear coupling is used in a coupling of the main output shaft of the operating mechanism with the grounded enclosure side main rotating shaft, and the movable pulley is installed on the operating mechanism, the operating mechanism may be drawn more completely from the operating mechanism box, and the workability in the inspection and the maintenance may be improved largely.

What is claimed is:

1. A gas-insulated circuit breaker having a grounded enclosure connected to the earth and enclosing insulation gas therein, an electric current interrupter having a fixed contactor provided in said grounded enclosure and a movable contactor for being contacted with and being separated from said fixed contactor, and an operating mechanism for outputting actuating force to actuate said movable contactor, said gas-insulated circuit breaker characterized by comprising a grounded enclosure side main rotating shaft connected to said movable contactor through a connection member, and a main output shaft for outputting a rotating force to actuate said movable contactor through said grounded enclosure side main rotating shaft provided on said operating mechanism, wherein said grounded enclosure side main rotating shaft and said main output shaft are arranged on a coax.

2. A gas-insulated circuit breaker having a grounded enclosure and enclosing insulation gas therein, an electric current interrupter having a fixed contactor provided in said grounded enclosure and a movable contactor for being contacted with and being separated from said fixed contactor, and an operating mechanism for outputting actuating force to actuate said movable contactor, said gas-insulated circuit breaker characterized by comprising a grounded enclosure side main rotating shaft connected to said movable contactor through a connection member, and a main output shaft for outputting a rotating force to actuate said movable contactor through said grounded enclosure side main rotating shaft provided on said operating mechanism, wherein said grounded enclosure side main rotating shaft and said main output shaft are arranged on a coax, and said grounded enclosure side main rotating shaft is connected to said main output shaft through a gear coupling.

3. A gas-insulated circuit breaker having a grounded enclosure and enclosing insulation gas therein, an electric current interrupter having a fixed contactor provided in said grounded enclosure and a movable contactor for being contacted with and being separated from said fixed contactor, and an operating mechanism for outputting actuating force to actuate said movable contactor, said gas-insulated circuit breaker characterized by comprising a grounded enclosure side main rotating shaft connected to said movable contactor through a connection member, and a main output shaft for outputting a rotating force to actuate said movable contactor through said grounded enclosure side main rotating shaft provided on said operating mechanism, wherein said grounded enclosure side main rotating shaft and said main output shaft are arranged on a coax through a gear coupling, and said operating mechanism is arranged almost under said grounded enclosure.

4. A gas-insulated circuit breaker as defined in claim 1, comprising a movable pulley provided on said operating mechanism to make said operating mechanism move to top and bottom, front and back, and right and left directions.

5. A gas-insulated circuit breaker having a grounded enclosures for a bus which respectively has a metal conductor to transport an electric power and a contactors for mechanically contacting with and separating from each other, a gas-insulated circuit breaker, and a line side grounded enclosure, said gas-insulated circuit breaker comprising a grounded enclosure enclosing insulation gas, an electric current interrupter having a fixed contactor provided in said grounded enclosure and a movable contactor for being contacted with and being separated from said fixed contactor, and an operating mechanism for outputting actuating force to actuate said movable contactors, wherein a grounded enclosure side main rotating shaft connected to said movable contactor through a connection member, and a main output shaft for outputting a rotating force to actuate said movable contactor through said grounded enclosure side main rotating shaft provided on said operating mechanism, are arranged on a coax, and rotation torque to be outputted by said main output shaft is transmitted to said grounded enclosure side main rotating shaft by using a gear coupling, and said operating mechanism is arranged almost under said grounded enclosure.

* * * * *